United States Patent [19]

Asahi et al.

[11] Patent Number: 4,696,216
[45] Date of Patent: Sep. 29, 1987

[54] ACOUSTIC OUTPUT DEVICE FOR PERSONAL COMPUTER

[75] Inventors: Takeoki Asahi, Ikoma; Toshihiko Yoshida, Nara, both of Japan

[73] Assignee: Sharp Kabushiki Kaisha, Osaka, Japan

[21] Appl. No.: 739,852

[22] Filed: May 31, 1985

[30] Foreign Application Priority Data

May 31, 1984 [JP] Japan .................... 59-112740

[51] Int. Cl.⁴ .................. G10H 1/057; G10H 7/00; G09B 15/04
[52] U.S. Cl. ....................... 84/1.13; 84/1.26; 84/478
[58] Field of Search ............ 84/1.01, 1.13, 1.26, 84/1.28, 477 R, 478

[56] References Cited

U.S. PATENT DOCUMENTS

| 4,352,313 | 10/1982 | Ny | 84/1.01 X |
| 4,440,057 | 4/1984 | Ishibashi | 84/1.01 |
| 4,483,229 | 11/1984 | Tsukamoto et al. | 84/1.01 |
| 4,487,098 | 12/1984 | Mishima | 84/1.26 X |
| 4,506,581 | 3/1985 | Sunada | 84/1.26 X |
| 4,538,495 | 9/1985 | Sato | 84/477 R |

*Primary Examiner*—S. J. Witkowski
*Attorney, Agent, or Firm*—Birch, Stewart, Kolasch & Birch

[57] ABSTRACT

An acoustic output device for a personal computer includes an envelope setting circuit for setting elements of a tone including an envelope pattern, a first storage circuit for storing the element data of the tone, a music note setting circuit for setting note information of a music, a second storage circuit for storing the note information, and an acoustic output circuit for reading-out the note information and providing a tone with the element data.

12 Claims, 20 Drawing Figures

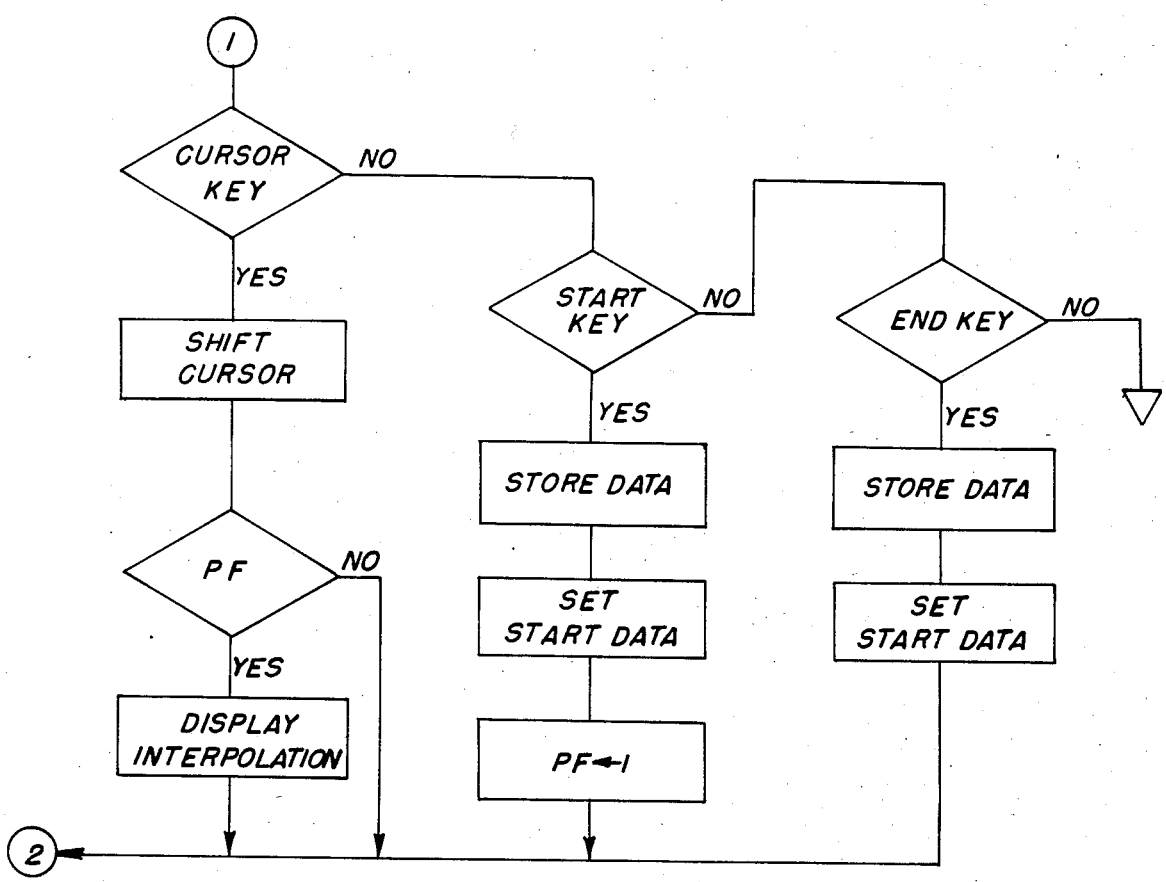
FIG. 4
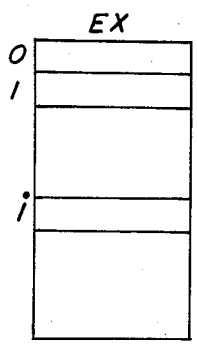 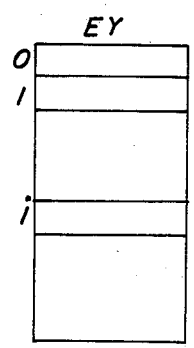 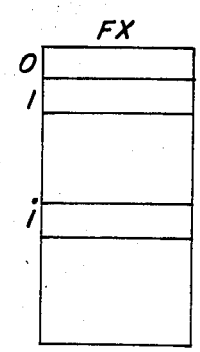 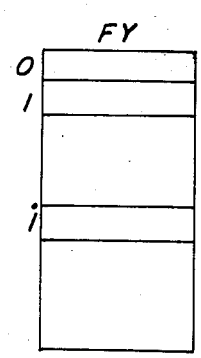
FIG.6(A)   FIG.6(B)   FIG.6(C)   FIG.6(D)

START KEY

CURSOR KEY

END KEY

CURSOR KEY

END KEY

CURSOR KEY

END KEY

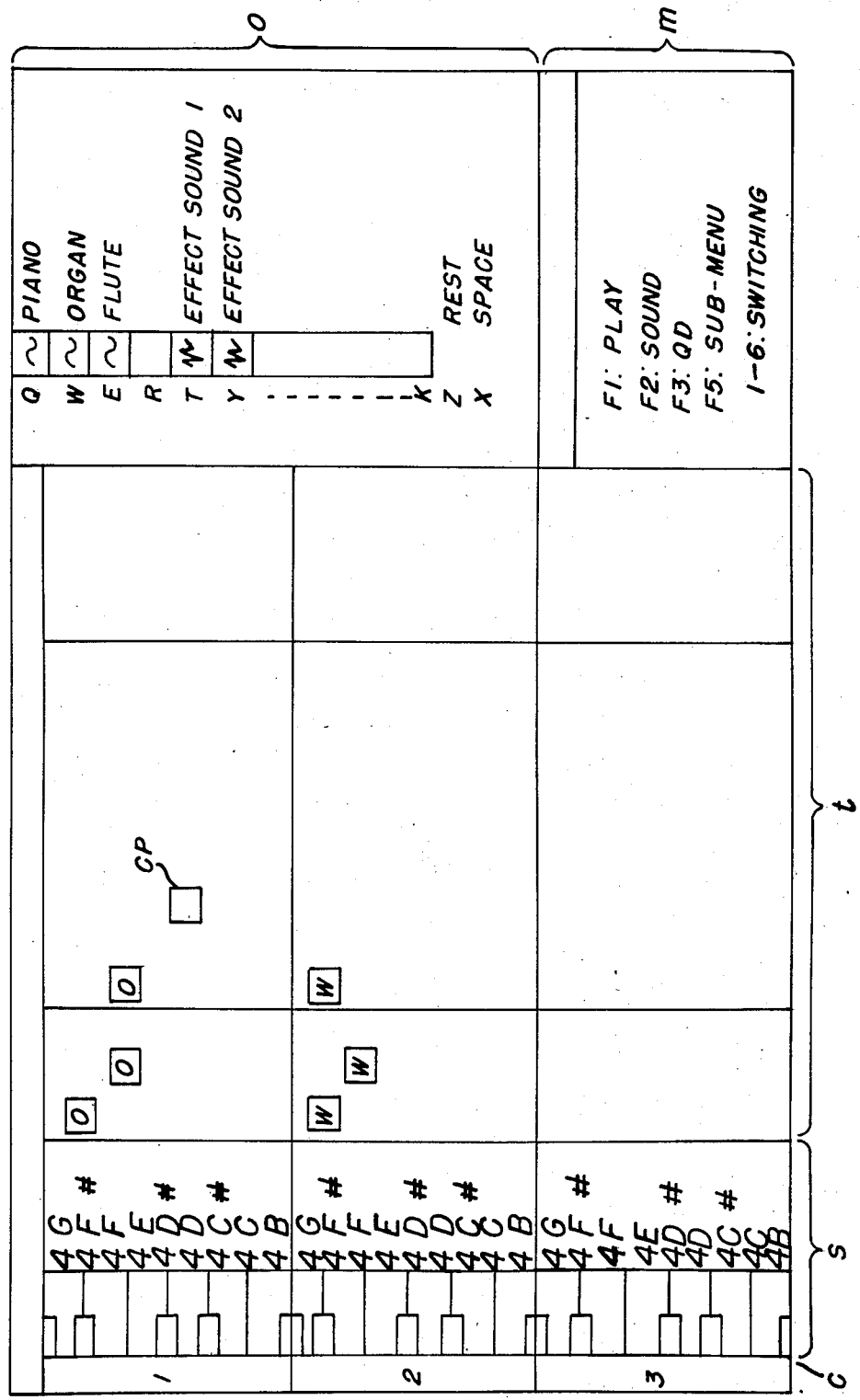

ACOUSTIC OUTPUT DEVICE FOR PERSONAL COMPUTER

BACKGROUND OF THE INVENTION

The present invention relates to an acoustic output deice and, more particularly, to an improved acoustic output device for a digital computer such as a personal computer.

Conventionally, an acoustic output device in a personal computer comprises a programmable sound generator (PSG) for providing an acoustic output. The PSG can only select one prescribed envelope pattern, so that it cannot set a desired envelope pattern and cannot change the frequency. Further, it is impossible to previously set the envelopes and the frequency changes in order to produce desired music.

SUMMARY OF THE INVENTION

Accordingly, it is an object of the present invention to provide an improved acoustic output device for a personal computer in order to select a desired envelop pattern and a frequency change pattern.

It is another object of the present invention to provide an improved acoustic output device for a personal computer to selecting any desired envelope pattern and a frequency change pattern, so that using the thus selected tone, data corresponding to a music can be inputted. Briefly described, in accordance with the present invention, an acoustic output device for a personal computer comprises envelope setting means for setting elements of a tone including an envelope pattern, first storage means responsive to the envelope setting means for storing data related to elements of the tone, music note setting means for setting note information of the music, second storage means responsive to the music note setting means for storing the note information, and acoustic output means responsive to the music note setting means and the envelope setting means for reading-out the note information and providing a tone with the element data.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 3 and 4 are flow charts of the operation in the sound editor mode;

FIGS. 6(A) through 6(D) show the contents of a memory for storing the envelope pattern and the frequency change pattern;

FIG. 7 is a typical picture displayed in a music editor mode in the personal computer to prepare data corresponding to a piece of music;

DESCRIPTION OF THE PREFERRED EMBODIMENT

Figure 1:
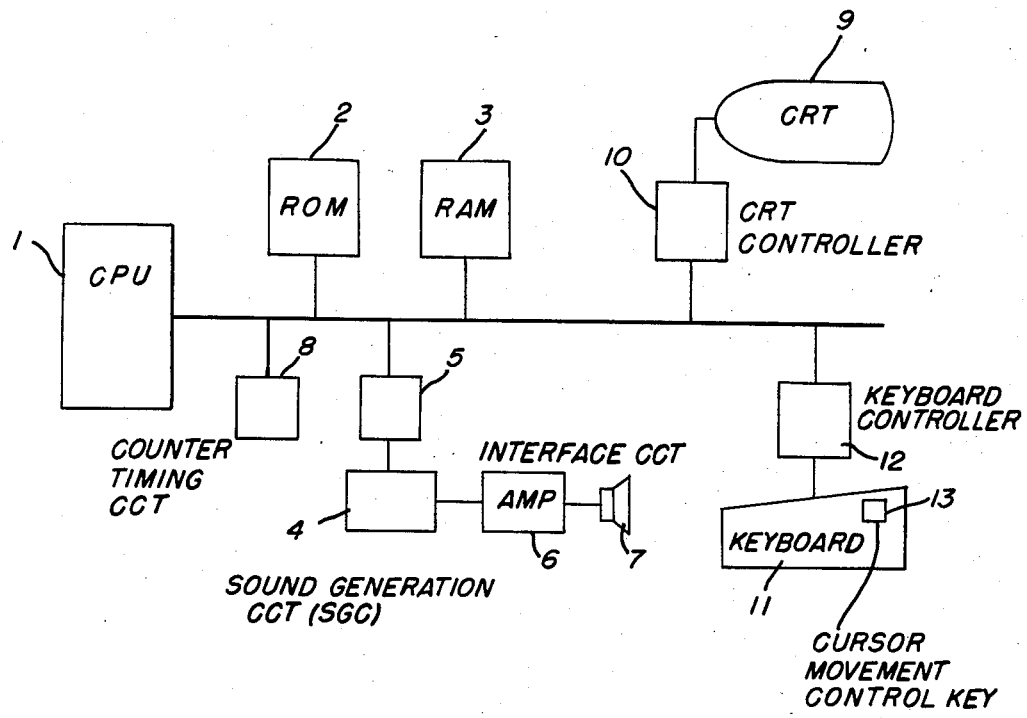
FIG. 1 is a block diagram of a personal computer according to the present invention.

FIG. 1 is a block diagram of an acoustic output device in a personal computer for selecting any desired envelope pattern and frequency change pattern, so that using the thus selected tone, data equivalent to the music can be inputted according to the present invention.

The personal computer comprises a central processing unit (CPU) 1, a read only memory (ROM) 2, a random access memory (RAM) 3, a sound generation controller (SGC) 4, an interface 5, an amplifier (AMP) 6, a speaker 7, a counter timing circuit 8, a display such as a cathode-ray tube (CRT) 9, a CRT controller 10, a keyboard 11, and a keyboard controller 12.

The CPU 1 is operated to dominate the operation of the personal computer. For example, it may be, for example, a Z-80 microprocessor commercially available from SHARP CORPORATION in Japan. The ROM 2 stores an initial program loading program (IPL) and a system monitor program. The RAM 3 is a dynamic RAM for storing programs loaded from an external memory and functioning as various registers, buffers, and flags. The sound generation circuit SGC 4 may be, for example, an SN 76489 commercially available from TEXAS INSTRUMENTS INCORPORATED in USA. An interface 5 is provided between the CPU 1 and the SGC 4 for interfacing the SGC 4 to the CPU 1. An AMP 6 is provided for amplifying acoustic signals to be outputted from the speaker 7. A counter timing circuit 8 is provided for generating an interruption signal to the CPU 1. A CRT controller 10 is provided for controlling the CRT 9. The keyboard 11 is operated to input key inputted data. A keyboard controller 12 is provided for controlling the operation of the keyboard 11.

Figure 2:
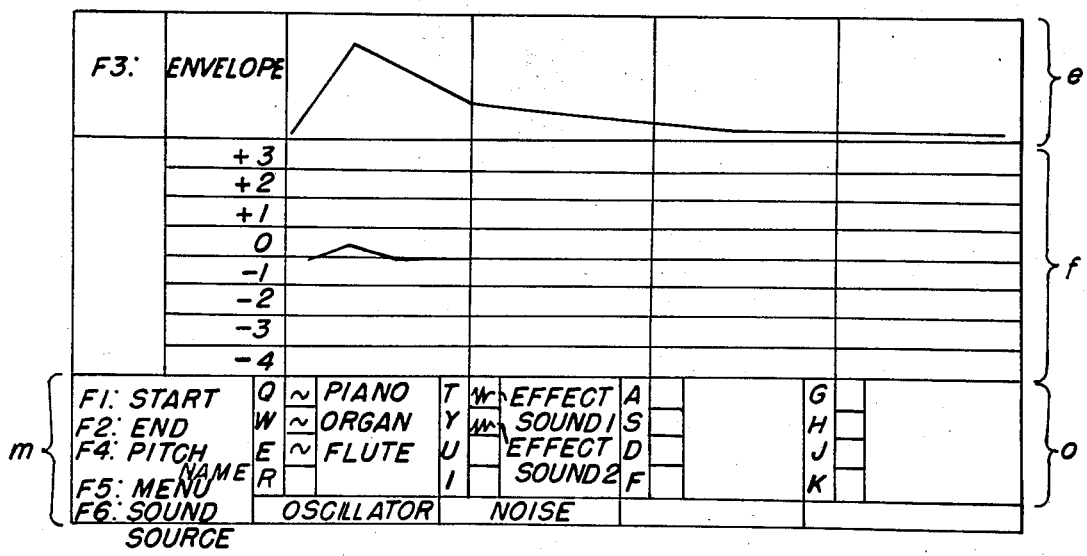
FIG. 2 is a typical picture displayed in a display of the personal computer in a sound editor mode.

FIG. 2 is a typical picture displayed in a sound editor mode in the personal computer. The picture of FIG. 2 contains an envelope pattern window e, a frequency change pattern window f, a pitch name window o, and a menu window m. An envelope pattern is displayed in the envelope window e. The frequency change pattern is displayed in the frequency change pattern window f. The pitch name window o is used to show the pitch name and whether the tone source of the pitch name is an oscillator or the sound of the tone is a noise. The menu window m is used to show the menus.

In the windows e and f, the abscissa is time and a single interval is 0.32 sec, with four intervals totalling 1.28 sec. The ordinate in the envelop window e indicates the strength of the tone. The ordinate in the frequency change window f is a variation of the frequency change in which a semitone in the musical intervals of the equal temperament of 12 degrees corresponds to a single scale. A plurality of pitch names can desirably correspond to the English letters. For example, in FIG. 2, English letter "Q" corresponds to a piano and "W" corresponds to an organ. The color of the letter of the pitch name, in the window o, relating to the presently displayed envelope pattern and frequency change pattern is different from the colors of the others. The symbol appearing adjacent the pitch name distinguishes whether the musical source is the oscillator (substantially, the sine wave) or noise. In the example of FIG. 2, the musical source used for the piano, the organ, and the flute is the oscillator while the source for effect sound 1 and effect sound 2 is a noise.

The menu window m is used to display a plurality of definable key switches F1 through F6 together with their corresponding key instructions. Key F1 is operated for setting an envelope pattern while key F2 is operated for setting a frequency change pattern. Each time key F3 is operated, an envelope setting mode and a frequency setting mode are alternatively converted. Key F4 is operated to set or amend the pitch name. Key F6 is operated to convert the two musical sources. An English letter key corresponding to the pitch name is operated to set or amend this pitch name. When an English letter is operated, corresponding to the pitch name whose envelope pattern and frequency change pattern have been already selected, the tone of the pitch name can be outputted, being accompanied with displaying the envelope pattern and frequency pattern. Key F5 is operated to select a menu display mode in a music editor mode as described later.

Figure 3:
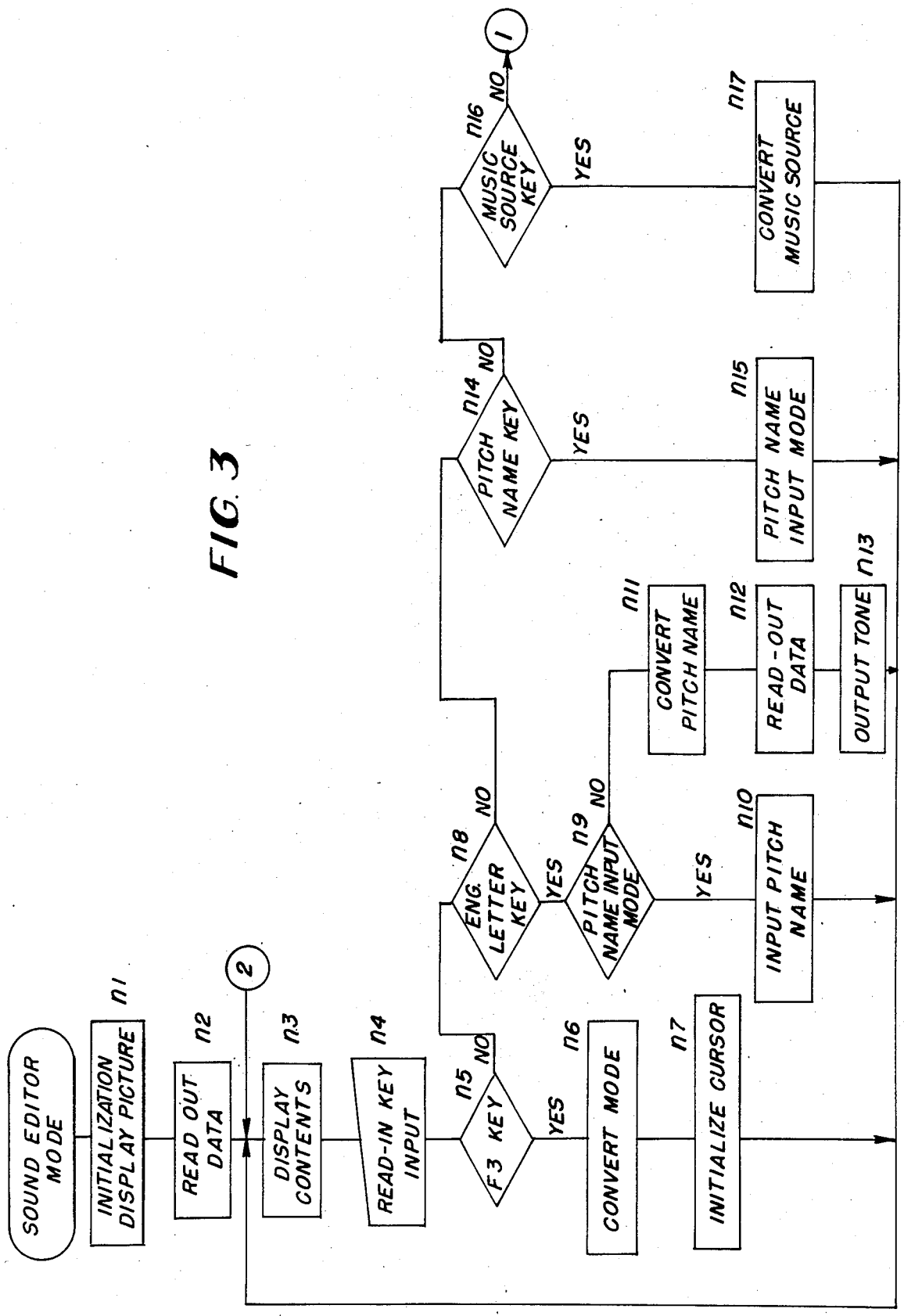

FIGS. 3 and 4 constitute a flow chart of the operation in a sound editor mode.

Step n1: Upon selecting the sound editor mode, various conditions and the values are initialized and a fixed pixture is displayed which displays the frames and the menu items of FIG. 2 not changed dependent upon the data.

Step n2: The data of the selected pitch name are read out.

Step n3: The contents of the data are displayed.

Step n4: The key input information is read-in, so that the operation corresponding to the operated key is processed.

Steps n5-n6-n7: When the key F3 is operated, the mode is converted and the cursor position is initialized. If the key F3 is operated in the frequency change pattern setting mode, the envelope pattern setting mode is selected, in which the cursor position is initialized.

Steps n8-n9-n11-n12-n13: When it is detected that an English letter key is operated, the pitch name corresponding to this English letter is switched, so that the corresponding envelope pattern, frequency pattern, and musical source information are read-out. The tone is outputted.

Steps n8-n9-n10: In the pitch name input mode, an English letter is inputted, so that the letter code is treated as the pitch name to thereby store the data corresponding to the English letter.

Steps n14 and n15: If the pitch name key F4 is operated, a mode of inputting the pitch name is selected.

Steps n16 and n17: When the musical source key F6 is operated, the musical source information is converted and stored.

FIGS. 5(A) through 5(G) are some examples between the key input operations and the displays.

Figure 5A:
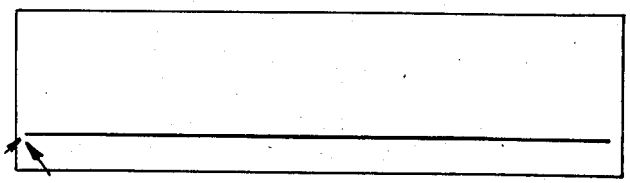
FIGS. 5(A) through 5(G) are illustrations of the relationships between key operations and the corresponding displays, showing the steps of setting an envelope pattern.

FIG. 5(A) is a display in the initial condition. An arrow directed right upward indicates the starting cursor while another arrow left upward indicates a moving cursor. The start key is operated as shown in FIG. 5(A), so the position of the moving cursor is set and stored as the starting point.

Figure 5B:
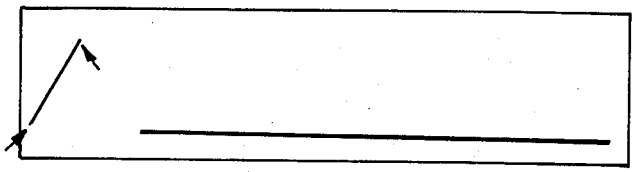

According to the operation of the cursor key 13, the moving cursor is shifted as shown in FIG. 5(B), so that the line is drawn between the starting point and the position of the moving cursor.

Figure 5C:
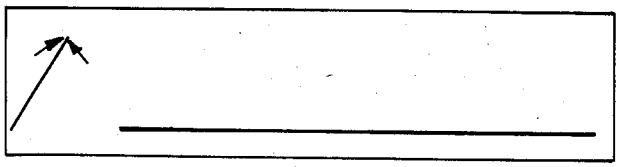

As shown in FIG. 5(C), the end key is operated so that the position of the moving cursor is stored and the position of the moving cursor is selected as a new starting point.

Figure 5D:
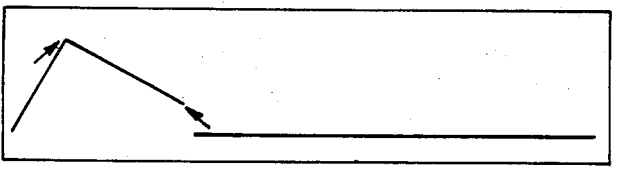

As shown in FIG. 5(D), the cursor key is operated to shift the moving cursor. Similarly with the case of FIG. 5(B), the line is drawn between the starting point and the moving cursor.

Figure 5E:
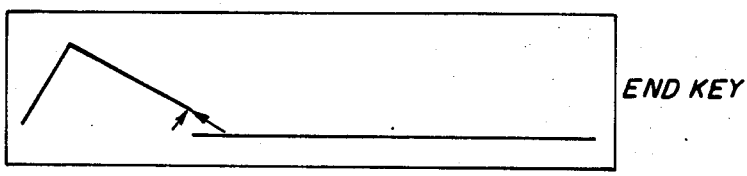

As shown in FIG. 5(E), the end key is operated so that the position of the moving cursor is stored and the point of the moving cursor is set as a new starting point.

Figure 5F:
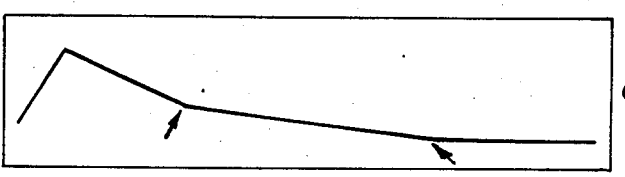
Figure 5G:
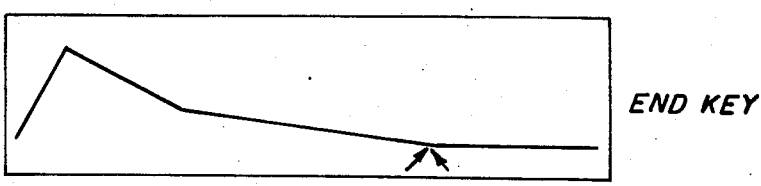

Similarly to FIG. 5(D), the envelope pattern as shown in FIG. 5(F) is prepared. The envelope pattern is stored in FIG. 5(G) as the coordinate data at the inflection points. In FIG. 5(G), and in the same way described with respect to FIG. 5(E), the end key is operated so that the position of the moving cursor is stored and the point of the starting cursor is moved to that of the moving cursor.

FIGS. 6(A) through 6(D) show the contents of a memory for storing the ordinate data as a table. In FIG. 6(A), "EX" indicates the position on the axis of the time while "EY" of FIG. 6(B) indicates the strength of the tone. The positions of the inflection points are stored.

Now turning back to the flow chart of FIG. 4, the processing of setting the envelope pattern and the frequency change pattern is described. Upon the operation of the cursor key 13, the moving cursor is moved. When the start key F1 is operated, this point is stored and set as the starting point. A flag "PF" is set. When the cursor key is operated, the moving cursor is moved and the linear interpolation between the starting point and the moving cursor point is made and displayed. When the end key is operated, the position of the moving cursor is stored as the data, so that this point is set as the starting point.

The frequency change pattern is set in the same manner. "FX" of FIG. 6(C) is provided for storing the positions of the inflection points in the axis of time while "FY" of FIG. 6(D) is provided for storing the values of the variation amount of the music intervals. In FIG. 2, the scales are displayed to be "−4" to "+3". As mentioned above, a single scale corresponds to the semitone in the music intervals in the equal temperament of 12 degrees. When the cursor is put outside the zone of the window f, the contents of the window f are scrolled upward and downward for displaying. Thus, the frequency changes can be displayed to be "−16" to "+16 semitone".

FIG. 7 is a typical picture in the display in the music editor mode for preparing data corresponding to a music. In FIG. 7, window c is provided for displaying the channel number. Window s is used to display the music intervals. Window t is used to display the timings. Window o is used to display the pitch name and the English letter corresponding to this pitch name. Window m is used to display the menus. In the window t, the abscissa indicates time while the ordinate indicates the musical interval corresponding to the contents of the window s, in which the English letter to be displayed corresponds to the pitch name. In the single screen, three channels can be displayed although 6 channels are contained so that the sextet chord is possible. In the example of FIG. 7, the tone "4F sharp" called "Q" of piano and the tone "4F sharp" called "W" of organ are simultaneously sounded.

Figure 8:
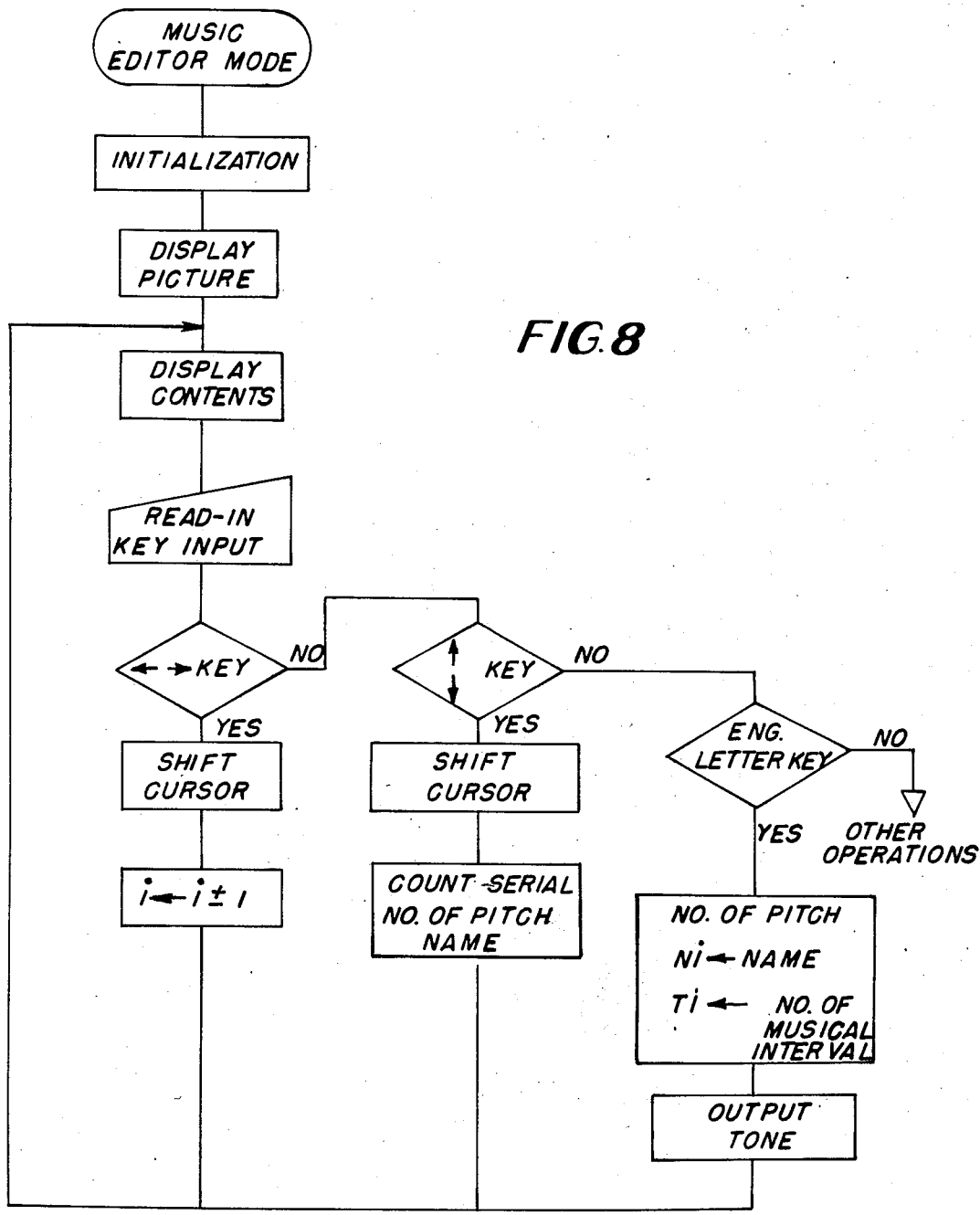
FIG. 8 is a flow chart of the operation in the music editor mode.

FIG. 8 is a flow chart of processing in the music editor mode.

The various conditions are initialized. The non-changeable frames and menus as shown in FIG. 7 are displayed. The contents of the music interval window and the timing window are displayed. The key input information is read-in. Upon the operation of the right or left cursor, the cursor is moved and timing data i corresponding to the position of the cursor is counted. Upon the operation of the upward or downward cursor, the cursor is moved and the number of the music interval corresponding to the cursor position is counted. In FIG. 7, symbol "CP" displayed in the timing window t of the channel 1 is a cursor which is moved according to the operation of the cursor key. In a case where the cursor is positioned inside the window of one channel and positioned at the upperside, upon the operation of the upward-moving cursor, the window for the music interval window s in the same channel and the timing window t are scrolled downward. Similarly, when the cursor is positioned at the bottom and the downward-moving cursor is operated, the displayed picture is scrolled upward. When the cursor is positioned at the left side, the operation of the left-moving cursor enables the scrolling to the right. When the cursor is positioned at the right side, the operation of the right-moving cursor enables the scrolling to the left.

After the cursor is positioned at an appropriate position, the operation of an English letter key permits the storage of the serial number of the pitch name of the corresponding tone into a memory N and the storage of the music interval corresponding to the position of the cursor as the serial number of the music interval into another memory T.

Figure 9A:
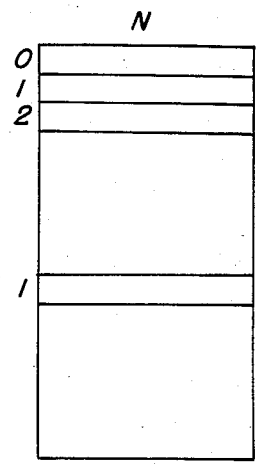
FIGS. 9(A) and 9(B) are the contents of a memory for storing a pitch name and a musical interval.
Figure 9B:
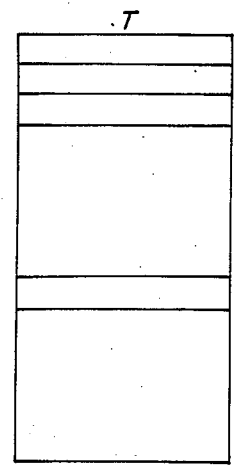

FIGS. 9(A) and 9(B) are the structure of the memories N and T, respectively. Per timing i, these memories store the pitch name and the music interval in a pair. Based on the data thus set, a music is played. To play the music, the interruption is made from the counter timing circuit 8 to the CPU 1 for a predetermined time, for example, 10 m sec. According to the interruption, the CPU 1 provides necessary data to the sound generation controller 4.

Figure 10:
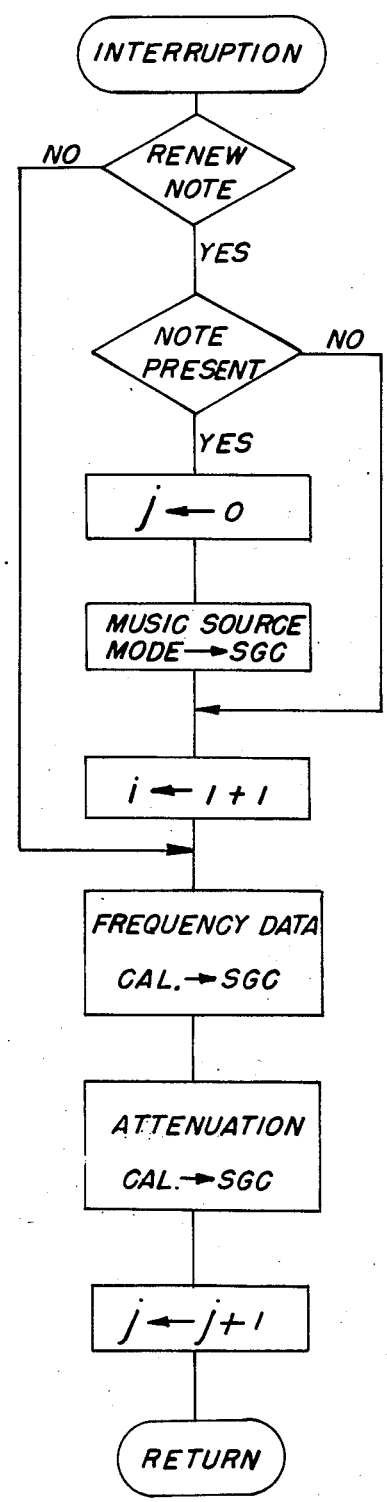
FIG. 10 is a flow chart of an interruption operation.

FIG. 10 is a flow chart of the interruption procedure. First, it is detected whether it is the timing to renew music note. For this purpose, a counter is provided for counting the timings corresponding to those of FIG. 7. If it is the timing to renew the music note, it is detected whether a music note is set in the timing, based on the contents of i-th item of the memory of FIGS. 9(A) and 9(B). If the music note is selected, the counter is reset. The counter represents the times for the envelope pattern and the frequency change pattern as shown in FIG. 2. The music source mode is outputted into the sound generation controller 4. The music source mode, namely, the distinction between the oscillator and the noise, is stored as corresponding to the serial number of the pitch name. A counter i is counted up by one so as to be ready for the output of the next note data. The frequency data and the attenuation data are calculated and are then outputted to the sound generation controller 4. The frequency data are calculated according to both the frequency change data comprising the FX data of FIG. 6(C) and the FY data of FIG. 6(D), and the serial number data of the music interval of the data T of FIG. 9. The attenuation data are calculated according to both the envelope pattern data comprising the data EX of FIG. 6(A) and the data EY of FIG. 6(B). Thereafter, a counter j is counted up, so as to terminate the interruption.

In the interruption, if it is not the timing to renew the note, the frequency data and the attenuation data are calculated to thereby be outputted into the sound generation controller 4. Even if it is the timing to renew the note, it is the timing without any relation to a note, so that the counter j is not reset. In such a case, the tone of the previous note is continued according to the envelope pattern.

As shown in the pitch name window o of FIG. 7, English letter Z designates a rest while X designates a space. In the case of the space, the previous tone is continued. As shown in the menu window m of FIG. 7, the operation of the F2 key enables the switching to the sound editor mode. When the F3 key is operated, the thus set data can be saved in an external memory.

As described above, according to the present invention, any desired envelope pattern and frequency change pattern can be selected. Based on the tone pattern, the data corresponding to the music can be easily selected, also.

While only certain embodiments of the present invention have been described, it will be apparent to those skilled in the art that various changes and modifications may be made therein without departing from the spirit and scope of the present invention as claimed.

What is claimed is:

1. An acoustic output device comprising:
   envelope setting means for creating elements of a tone, including creating an envelope pattern representing elements of said tone over time and having a plurality of user defined envelope segments;
   first storage means, responsive to said envelope setting means, for storing data representative of each envelope segment of said tone;
   music note setting means for setting note information for a piece of music;
   second storage means, responsive to said music note setting means, for storing the note information;
   acoustic output means responsive to said music note setting means and said envelope setting means for reading-out the note information and said data and providing a tone having said elements with the plurality of envelope segments represented by said data; and
   display means, responsive to said envelope setting means, for displaying note information having the envelope pattern created thereby.

2. The device of claim 1, wherein said acoustic output device is incorporated into a personal computer.

3. The device of claim 1 wherein said display means also displays a menu of selectable operations.

4. An acoustic output device comprising:
   envelope setting means for introducing a desired envelop pattern for a note, said envelope setting means allowing an operator to select shape and size of each portion of said envelope pattern in a continuously variable fashion so as to create said desired envelope pattern of said note;
   first storage means, responsive to said envelope setting means, for storing data uniquely identifying said desired envelope pattern of said note;
   frequency change setting means for introducing frequency change information for said note representing the change of pitch of said note over time, said frequency change setting means allowing an operator to select the pitch of said note at each point in time in a continuously variable fashion to create said frequency change information for said note;
   second storage means, responsive to said frequency change setting means, for storing data uniquely identifying said frequency change information for said note;

music note setting means for introducing notes to be reproduced;

third storage means for storing said notes;

modification means, responsive to the outputs of said first, second and third storage means, for reading said notes from said third storage means, for modifying said notes with said envelope pattern and frequency change information by reading said data from said first and second memory means and modifying said notes using said data; and acoustic output means, responsive to said modification means, for audibly reproducing said modified notes to produce a desired musical composition.

5. An acoustic output device comprising:

input means for introducing information into said device, said input means including a plurality of function keys and a cursor movement key, said input means introducing envelope patter information in an envelope pattern output mode and frequency change information in a frequency change information input mode;

display means for displaying voice information related to a tone to be reproduced, said voice information including envelope pattern information and frequency change information, said display graphically displaying said envelope pattern information and frequency change information with respect to time in first and second display fields;

means, responsive to actuation of selected said function keys, for selecting between said envelope pattern input mode and said frequency change input mode;

said input means introducing said envelope pattern information and said frequency change information by actuating said cursor movement key to move first and second cursors on said display means which define the end points of a line segment, said display means displaying said line segment to graphically represent a portion of the envelope pattern information or frequency change information; and storing means for storing said envelope pattern information and said frequency change information introduced by said input means.

6. The device of claim 5 wherein said input means further includes means for introducing a melody including a plurality of notes, said storing means storing said melody;

said device further comprises modification means for recalling said melody, said envelope pattern information, and said frequency change information and for modifying each said note of said melody using said envelope pattern information and frequency change information.

7. The device of claim 6 further comprising acoustic output means, responsive to said modification means, for audibly reproducing said modified notes to produce a desired musical composition.

8. An acoustic output device comprising:

input means for introducing information into said device, said input means including a cursor movement key, said input means introducing envelope pattern information of a tone to be reproduced;

display means for display said envelope pattern information with respect to time; said display means further displaying at least one cursor;

control means for controlling the position of said cursor on said display means in response to actuation of said cursor movement key to define the end points of a line segment, said control means controlling said display to display said line segment to graphically represent at least a portion of an envelope pattern represented by said envelope pattern information; and storing means for storing said envelope pattern defined by said control means from said envelope pattern information introduced thereby said input means.

9. The device of claim 8 wherein said input means further includes means for introducing a melody including a plurality of notes, said storing means storing said melody;

said device further comprising modification means for recalling said melody and said envelope pattern information from said storage means and for modifying each said note of said melody with said envelope pattern information.

10. The device of claim 9 further comprising acoustic output means, responsive to said modification means, for audibly reproducing said modified notes to produce a desired musical composition.

11. A method of introducing envelope information related to a desired voice into a digital computer having a cursor, cursor movement key and display, said envelope information including at least one envelope representing a parameter of said desired voice comprising:

(a) defining the start point of a line segment at a point on said display representing a beginning point of a graphical representation of said envelope;

(b) moving said cursor with said cursor movement key to a point on said display graphically representing a point on said envelope to develop an envelope segment;

(c) storing said start and end points of said envelope segment and interpolating the points therebetween from said start and end points;

(d) moving said cursor with said cursor movement key to a new point on said display to graphically represent a new point on said display to develop a new envelope segment;

(e) storing said new envelope segment by repeating the storing step of step (c) and (f) repeating steps (d) and (e) until said envelope information is introduced.

12. The method of claim 11 wherein said parameter of said desired voice is frequency change information.

* * * * *